Aug. 23, 1960 V. R. GIBSON, JR 2,950,344

COMPENSATED NOISE CANCELLING CIRCUIT

Filed May 31, 1956

INVENTOR:
VAN R. GIBSON JR.
BY Donald N. Timbie
HIS ATTORNEY.

United States Patent Office 2,950,344
Patented Aug. 23, 1960

2,950,344

COMPENSATED NOISE CANCELLING CIRCUIT

Van R. Gibson, Jr., North Syracuse, N.Y., assignor to General Electric Company, a corporation of New York Filed May 31, 1956, Ser. No. 588,311

3 Claims. (Cl. 178—7.3)

This invention relates to improvements in a type of noise cancelling circuit wherein a signal having undesired noise is applied in opposite polarities to respective electrodes of an electric valve and wherein one of the electrodes is biased in such manner that only that portion of the signal exceeding a given amplitude level has any effect on the signal appearing at an output electrode of the valve.

In accordance with present television standards, the carrier is modulated in such manner that its amplitude varies between a minimum amplitude level and a maximum level in accordance with changes in the brightness of the image being televised. Synchronizing information is transmitted by increasing the amplitude of the carrier beyond the maximum level during synchronizing pulses. After amplitude detection, a video signal is produced that varies in amplitude in the same manner, so that synchronizing pulses have a greater amplitude than the rest of the signal. As is well known by those skilled in the art, noise pulses in the video signal generally extend in the same direction as the synchronizing pulses and may have an amplitude that is several times as great.

Noise cancellation circuits of the type mentioned above may also perform the function of separating the synchronizing pulses from the rest of the signal. This is effected by applying the synchronizing pulses to an outer control electrode by means of a circuit that prevents the portion of the video signal occurring between the synchronizing pulses from having any substantial effect on the signals appearing at the output electrode. Such a circuit may include a capacitor that is charged during the synchronizing pulses by current drawn from the outer control grid. The charge is sufficient to cause this control grid to prevent flow of energy to the output electrode during the intervals between synchronizing pulses. If large pulses of noise extending in the same direction as the synchronizing pulses are present, the resulting charge on the capacitor is much greater than it is in response to the synchronizing pulses and may often be sufficient to prevent many of the following synchronizing pulses from producing any corresponding pulses at the output electrode. Hence, the circuit may be paralyzed so as to be inoperative for some time with the result that the television receiver is not properly synchronized.

In order to avoid this difficulty, the signal is applied to an inner control electrode in such polarity that the synchronizing pulses and the noise pulses tend to reduce the flow of energy toward the outer control electrode and the output electrode. For a given signal amplitude the inner control electrode can be biased in such manner that the flow of energy is reduced to zero at a voltage level just beyond the peaks of the synchronizing pulses. Noise pulses of a greater amplitude cut off the flow of energy entirely so that the outer control electrode cannot draw current and overcharge the capacitor.

However, if the signal amplitude decreases, energy flowing toward the outer electrode is not cut off just beyond the tips of the synchronizing pulses, but at a point that may be far beyond them. Hence, the outer control grid may draw enough current to charge the capacitor by a sufficient amount to cause the circuit to be paralyzed for following synchronizing pulses. On the other hand, if the signal amplitude increases, the flow of energy toward the outer electrode and the output electrode may be cut off before the tip of the synchronizing pulses is reached so that no synchronizing pulses appear at the output electrode.

Accordingly, it is an object of this invention to provide an improvement in circuits of the type described so that the circuit is not adversely affected by noise pulses when weak signals are received and synchronizing signals reach the output electrode with sufficient amplitude when strong signals are received.

Briefly, this objective is accomplished in accordance with this invention by provision of means for varying the bias on the inner control electrode in such manner that the flow of energy toward the outer control electrode and the output electrode is cut off at a voltage level just beyond the tips of the synchronizing pulses. In this way, the synchronizing pulses reach the output electrode with nearly full amplitude and at the same time, there is a substantial reduction in the adverse effects of noise.

For a better understanding of the invention, reference will now be made to the drawings in which.

Figure 1:
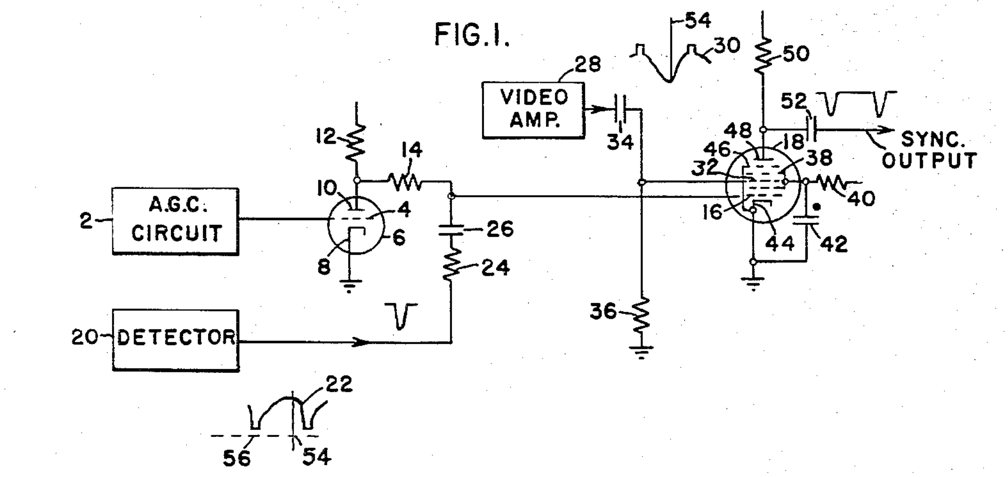
Figure 1 is a schematic representation of a circuit embodying this invention.

Refer now to Figure 1 wherein any suitable source 2 of negative AGC voltage is shown as being coupled to a control grid 4 of a triode amplifier 6 having a cathode 8 connected to ground, and an anode 10 connected to a source of B+ voltage via a suitable load impedance, here shown as comprising a load resistor 12. A rather large resistor 14 is connected between the anode 10 and an inner control electrode 16 of a known sync separation noise cancellation amplifier 18. Any suitable source 20 of video signals, such as indicated by the numeral 22, is coupled to the electrode 16 as by a resistor 24 and a capacitor 26. The capacitor 26 serves several functions. It prevents the B+ voltage applied to the anode 10 from reaching the detector 20 and it aids in widening the negative noise pulses applied to the grid 16 from the detector 20.

A video amplifier 28 or other source provides video signals in which the synchronizing pulses are positive, as indicated by the wave 30, and is coupled to an outer control electrode 32 in any suitable manner as by a capacitor 34 and a grid leak resistor 36. A screen electrode 38 is connected to a source of B+ potential via a suitable load resistor 40 and an electrolytic capacitor 42 connected between this electrode and a grounded cathode 44. The regulation of the voltage thus applied to the screen electrode 38 should be rather good. In this particular embodiment, a suppressor electrode 46 is internally connected to the cathode 44 and an anode 48 is connected to a B+ potential via a suitable load resistor 50. The separated synchronizing pulses appear at the anode 48 and may be coupled to a utility device by a capacitor 52.

In operation, the positive synchronizing pulses in the wave 30 make the outer grid 32 positive with respect to the cathode so as to produce a negative pulse at the anode 48. At the same time, the grid 32 draws current and charges the capacitor 34, and between synchronizing pulses the discharge of this capacitor through the grid leak resistor 36 is sufficient to keep the grid 32 cut off.

However, if a strong noise pulse 54 is present in the signal 30, the capacitor 34 would, if it were not for the action of the grid 16, be charged so heavily as to make the grid 32 cut off the flow of electrons to the anode 48 even during following positive synchronizing pulses. Such a situation is prevented as the application of a corresponding pulse 54' of noise in the wave 22 to the inner control grid 16 cuts off the flow of electrons toward the outer control grid 32, so that the latter cannot draw any current.

Assuming that the signals represented by the waves 30 and 22 are of average amplitude, the bias between the inner grid 16 and the cathode 44 can be set in the absence of this invention so that the electron flow is cut off at a voltage level 56 beyond the tips of the synchronizing pulses in the wave 22. It should be pointed out that the application of the signal 22 to the grid 16 causes the amplitude of the synchronizing pulses appearing at the anode 48 to be reduced somewhat, but this is better than having full amplitude synchronizing pulses accompanied by full amplitude noise pulses. The characteristics of the grid 16 are generally such that the portion of noise pulses between the tips of the synchronizing pulses and the level 56 produce very little disturbance at the anode 48. However, if the signal amplitude decreases, the portion of the noise pulses between the tips of the synchronizing pulses and the level 56 increases with the result that there is less cancellation of the noise. If the signal amplitude is small enough, the noise pulses may charge the capacitor 34 sufficiently to block or paralyze the circuit, as previously explained, before the noise pulses applied to the grid 16 cut off the electron stream so as to prevent further charging of the capacitor 34. Even if this does not occur, a great deal of noise will appear at the anode 48 and will cause improper operation of the synchronizing circuits coupled to it.

On the other hand, if the signal amplitude increases to a point where the tips of the synchronizing pulses in the wave 22 reach or extend below the level 56, the electron stream is cut off during the synchronizing pulses so that a positive instead of a negative synchronizing pulse appears at the anode 48. As the synchronizing circuits coupled to the anode 48 require a given polarity of synchronizing pulse, the reversal in polarity causes either a complete lack of synchronization or improper synchronization.

The circuit of this invention operates to prevent these undesirable results by providing means for varying the bias on the grid 16 in accordance with the amplitude of the signals provided by the detector 20. In this particular embodiment of the invention, the means includes the amplifier 6 for as can be seen, it operates to vary the bias applied to the grid 16 in accordance with the AGC voltage and this voltage is related to the amplitude of the signal provided by the detector 20 for reasons well known to those skilled in the art.

Although other values of the various circuit elements of Figure 1 may be used, the following list indicates those that have been found suitable.

Amplifier 6—12AT7:

| | |
|---|---|
| $R_{12}$ | 470 K (*K*=1000). |
| $R_{14}$ | 1.2 megohms. |
| $C_{26}$ | .005 $\mu$f. |
| $R_{24}$ | 120 K. |
| $C_{34}$ | .0033 $\mu$f. |
| $R_{36}$ | 0.5 megohms. |

Amplifier 18—6BY6:

| | |
|---|---|
| $R_{50}$ | 100 K. |
| $R_{40}$ | 22 K. |
| $C_{42}$ | 0.1 $\mu$f. |

Figure 2:
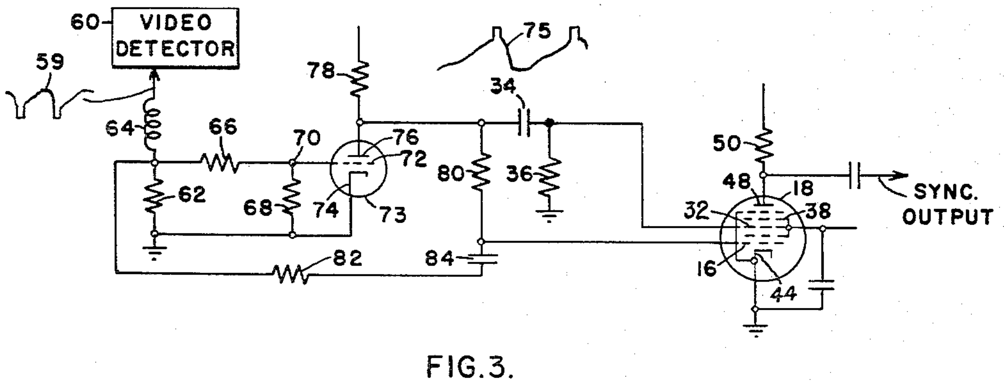
Figure 2 is similar to Figure 1 except that a single amplifier is used to amplify the synchronizing pulses and to provide a control voltage of suitable amplitude and polarity.

Figure 2 is similar in some respect to Figure 1 and corresponding components are indicated by the same numerals. A source of video signals having negative synchronizing pulses as indicated by the wave 59 may be a second detector 60 and is coupled via a peaking inductor 64 to a load impedance, herein shown as a resistor 62, having one end grounded. Resistors 66 and 68 are connected in series-parallel relationship with the load impedance 62 and a reduced amplitude of the video signal appearing at their junction 70 is applied directly to a control grid 72 of a synchronizing amplifier 77 having its cathode 74 connected to ground and its anode 76 connected to a point of B+ voltage via a load resistor 78. A capacitor 34 and a grid leak resistor 36 couple this video signal (waveform 75) appearing at the anode 76 to the outer control grid 32 of the amplifier 18 that serves to cancel noise and separate the synchronizing pulses as described in connection with Figure 1.

As previously explained, this invention requires that means be provided for varying the bias on the grid 16 of the noise cancelling amplifier 18 in accordance with the signal amplitude at the output of the detector 10. In the circuit of Figure 2, this is achieved by applying the signal appearing at the anode 76 to the grid 16 via a rather large resistor 80. The negative cancelling signal is derived from the ungrounded end of the detector load resistor 62 and is coupled to the inner grid 16 via a resistor 82 and a blocking or coupling capacitor 84 connected in series. It will be noted that a separate source of AGC voltage is not coupled to this circuit as it was in the circuit of Figure 1. One way of explaining the manner in which the variable bias is obtained for the grid 16 is as follows: It will be noted that the grid 16 will always draw current as it is connected to B+ voltage via the resistors 80 and 78. Under these conditions, the effective resistance between the grid 16 and the cathode 14 is in the order of a few hundred ohms. As this is extremely small with respect to the resistance of the resistor 80, only a small fraction of the positive potential appearing at the anode 76 appears at the grid 16. As the amplitude of the signal at the output of the detector 10 varies, the amplitude of the signal at the anode 76 varies in like manner. The resistor 80 and the capacitor 84 have such an RC time constant that the voltage at their junction follows the low frequency variations in amplitude of the signal at the anode 76.

Even though the current drawn by the grid 16 increases with signal amplitude so that the resistance between it and the cathode 44 decreases, the net effect is to make the grid 16 more positive. Hence, as the signal amplitude increases, the grid 16 is made more positive so that the larger negative synchronizing pulses applied to it by the second detector do not cut off the electron flow. As the signal strength decreases, the potential on the grid 16 becomes less positive so that the smaller negative synchronizing pulses do not cut off the electron flow, but the larger noise pulses do. This is the result desired. The capacitor 84 serves to decouple the detector 60 and its load from the direct current voltage at the grid 16.

It will be evident to one skilled in the art that various combinations of circuit components can be used and that the following list of values of various circuit components is merely by way of example:

| | |
|---|---|
| $R_{62}$ | 3.3 K(K=1000). |
| $R_{66}$ | 10 K. |
| $R_{68}$ | 10 K. |
| $R_{78}$ | 39 K. |
| $R_{80}$ | 2 megohms. |
| $R_{82}$ | 33 K. |
| $C_{84}$ | .05 $\mu$f. |
| Amplifier **73** | ½ of a 12AT7. |
| Amplifier **18** | 6BY6. |
| $L_{64}$ | 240 $\mu$h. |

Figure 3:
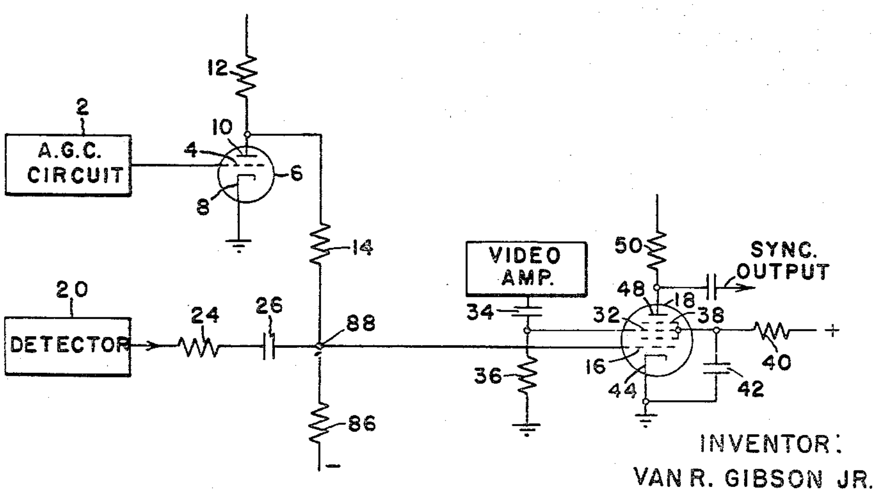
Figure 3 is similar to Figure 1, except for the biasing circuit.

The circuit of Figure 3 is similar in some respect to the circuit of Figure 1 and corresponding components thereof are indicated by the same numerals. An advantage of the circuit is that greater voltage variation is produced at the control grid 16 of the amplifier 18 as a result of variations in the AGC voltage supplied by the source 2, thus producing a greater amount of control. This effect is achieved by connecting the lower end of the resistor 14 to a point of well regulated negative potential via an impedance such as a resistor 86. The junction 88 between the resistors 14, 86 and the capacitor 26 is connected to the grid 16, and the negative potential applied to the lower end of the resistor 86 is of such value that a point of ground potential occurs at some point along the resistor 86 in the absence of any signals. Under these conditions a variation in the potential at the anode 10 of the amplifier 6 produces a greater variation at the grid 16 for the reason that the grid is now connected to a higher point on a potential divider comprised of the resistors 12, 14 and 86, whereas in Figure 1 the grid 16 is connected at a point that is very low on the potentiometer as only the grid-to-cathode resistance is between the grid and ground.

For purposes of example only, the various circuit components of Figure 3 may be as follows:

| | |
|---|---|
| $R_{12}$ | 34 K. |
| $R_{24}$ | 33 K. |
| $R_{14}$ | 390 K. |
| $R_{86}$ | 200 K. |
| $C_{26}$ | .05 $\mu$f. |
| $C_{34}$ | .0033 $\mu$f. |
| $R_{36}$ | 0.5 megohm. |
| $R_{50}$ | 15 K. |
| $R_{40}$ | 22 K. |
| $C_{42}$ | 0.1 $\mu$f. |
| Amplifier 6 | 12AT7. |
| Amplifier 18 | 6BY6. |

While I have illustrated a particular embodiment of my invention, it will of course be understood that I do not wish to be limited thereto since various modifications, both in the circuit arrangement and in the instrumentalities, may be made and I contemplate by the appended claims to cover any such modification as fall within the true spirit and scope of the invention.

What I claim as new and desire to secure by Letters Patent of the United States is:

1. A circuit for separating synchronizing signals and minimizing the effects of noise on the separated synchronizing signal comprising in combination a first amplifier having a cathode, an inner control electrode, a screen electrode, an outer control electrode and an anode, a source of B+ potential, a load impedance connected between said anode and said source, a second source of potential, a connection between said screen electrode and said second source, a direct connection between said cathode and ground, means for supplying video signals in which the synchronizing pulses are positive, a first capacitor connected between the output of said means and said outer control electrode, a grid leak resistor connected between said outer control electrode and ground, the RC time constant of said first capacitor and said grid leak resistor being long enough that only said positive synchronizing pulses produce any substantial output at said anode, a second amplifier having a cathode, a control electrode and an anode, a load impedance connected between said anode and said source of B+ potential, a resistor connected between said latter anode and said inner control electrode of said first amplifier, a source of negative automatic gain control voltage, means for applying said source of negative automatic gain control voltage to said control electrode of said second amplifier, a source of video signals in which the synchronizing pulses extend in a negative direction, a coupling network connected between said latter source and said inner control electrode of said second amplifier, said latter network including a second capacitor.

2. A circuit for separating synchronizing signals and minimizing the effects of noise on the separated synchronizing signal comprising in combination a first amplifier having a cathode, an inner control electrode, a screen electrode, an outer control electrode and an anode, a source of B+ potential, a load impedance connected between said anode and said source, a second source of positive potential, a connection between said screen electrode and said second source, a direct connection between said cathode and ground, a second amplifier having an anode, a control electrode and a cathode, a load impedance connected between said anode and said source of B+ potential, a connection between said latter cathode and ground, a source of video signals in which the synchronizing pulses are negative, means for coupling the output of said latter source to said control electrode of said second amplifier, a resistor connected between said anode of said second amplifier and said inner control electrode of said first amplifier, means including a first capacitor for A.-C. coupling the output of said latter source of video signals to said inner control electrode of said first amplifier, the RC time constant of said resistor and said first capacitor being of such magnitude that the potential at said inner control electrode of said second amplifier varies in accordance with the average amplitude of the video signals at said anode of said first amplifier, a second capacitor connected between said anode of said second amplifier and said outer control electrode of said first amplifier, a grid leak resistor connected between said latter control electrode and ground, the RC time constant of said second capacitor and said grid leak resistor being long enough that only the positive synchronizing pulses at the anode of said second amplifier produce any substantial output at the anode of said first amplifier.

3. A circuit as set forth in claim 1 wherein there is provided a source of negative potential and wherein a resistor is connected between said source and said inner control electrode of said second amplifier.

References Cited in the file of this patent

UNITED STATES PATENTS

| | | |
|---|---|---|
| 2,797,258 | Denton | June 25, 1957 |
| 2,814,671 | Adler | Nov. 26, 1957 |
| 2,868,873 | Splitt | Jan. 13, 1959 |

OTHER REFERENCES

"Noise Immune Sync Separator," Electronics, April 1952, by Marks, pages 125 and 126.